United States Patent
Liao et al.

(10) Patent No.: US 12,277,318 B2
(45) Date of Patent: Apr. 15, 2025

(54) ADAPTABLE REDRIVER DESIGN ON DRIVE BACKPLANE WITH UNIVERSAL BACKPLANE MANAGEMENT CONTROLLER

(71) Applicant: Hewlett Packard Enterprise Development LP, Spring, TX (US)

(72) Inventors: Chih-Sheng Liao, Taipei (TW); Tse-Jen Sung, New Taipei (TW); Chung-Hsiang Hsu, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 17 days.

(21) Appl. No.: 18/200,993

(22) Filed: May 23, 2023

(65) Prior Publication Data

US 2024/0393948 A1 Nov. 28, 2024

(51) Int. Cl.
*G06F 3/06* (2006.01)
(52) U.S. Cl.
CPC ............ *G06F 3/061* (2013.01); *G06F 3/0655* (2013.01); *G06F 3/0679* (2013.01)
(58) Field of Classification Search
CPC ....... G06F 3/0655; G06F 3/0679; G06F 3/061
See application file for complete search history.

(56) References Cited

U.S. PATENT DOCUMENTS

| | | | |
|---|---|---|---|
| 7,062,121 B2 | 6/2006 | Fitch et al. | |
| 8,782,477 B2 | 7/2014 | Klein et al. | |
| 9,594,716 B1 | 3/2017 | Nair et al. | |
| 9,692,589 B2 | 6/2017 | Iyer et al. | |
| 9,858,237 B2 | 1/2018 | Schnell | |
| 10,050,623 B2 | 8/2018 | Xiao et al. | |
| 10,887,075 B2 | 1/2021 | Srivastava et al. | |
| 11,038,723 B2 | 6/2021 | Rane et al. | |
| 2013/0132666 A1* | 5/2013 | Inoue | G06F 3/0689 711/112 |
| 2016/0154695 A1* | 6/2016 | Huang | G06F 11/0751 714/15 |
| 2019/0026022 A1* | 1/2019 | Nelogal | G06F 3/0631 |
| 2019/0068397 A1 | 2/2019 | Chen | |
| 2021/0305947 A1 | 9/2021 | El Sabbagh et al. | |

* cited by examiner

*Primary Examiner* — Edward J Dudek, Jr.
(74) *Attorney, Agent, or Firm* — Yao Legal Services, Inc.

(57) ABSTRACT

A system and method are provided to detect an event corresponding to the system powering up or a storage device being inserted into the backplane. In response to detecting the event, the system obtains configuration information associated with a physical topology of the backplane, the configuration information associated with: a first bus between a storage controller and a redriver; a second bus between the redriver and the storage device; the backplane; and the storage device. The system searches, in a data structure based on the configuration information, for an optimized redriver setting. The system activates, based on the optimized setting, the redriver by enhancing signals sent via the second bus to the storage device and by enhancing signals sent via the first bus to the storage controller, thereby facilitating enhancement of signal integrity between the storage components in the backplane.

20 Claims, 6 Drawing Sheets

| CONFIG NAME / ID 202 | CABLE 204 | BACKPLANE 206 | DRIVE TYPE 208 | OPTIMIZED REDRIVER SETTING 210 |
|---|---|---|---|---|
| CONFIG_A | CABLE_1 | BACKPLANE_1 | SAS | SETTING_A |
| CONFIG_B | CABLE_1 | BACKPLANE_1 | NVMe | SETTING_B |
| CONFIG_C | CABLE_1 | BACKPLANE_1 | SATA | SETTING_C |
| CONFIG_D | CABLE_2 | BACKPLANE_2 | SAS | SETTING_D |
| CONFIG_E | CABLE_1 | BACKPLANE_1 | NVMe | SETTING_E |
| CONFIG_F | CABLE_2 | BACKPLANE_2 | NVMe | SETTING_F |
| CONFIG_G | CABLE_2 | BACKPLANE_2 | SATA | SETTING_G |
| CONFIG_H | CABLE_2 | BACKPLANE_2 | SAS | SETTING_H |

FIG. 2A

| CONFIG NAME / ID 202 | CABLE 204 | BACKPLANE 206 | DRIVE TYPE 208 | OPTIMIZED REDRIVER SETTING(S) 242 |
|---|---|---|---|---|
| CONFIG_A | CABLE_1 | BACKPLANE_1 | SAS | {SETTING_A1, SETTING_A2, SETTING_A3 …} |
| CONFIG_B | CABLE_1 | BACKPLANE_1 | NVMe | {SETTING_B1, SETTING_B2, SETTING_B3 …} |
| CONFIG_C | CABLE_1 | BACKPLANE_1 | SATA | {SETTING_C1, SETTING_C2, …} |
| CONFIG_D | CABLE_2 | BACKPLANE_2 | SAS | {SETTING_D1} |
| CONFIG_E | CABLE_1 | BACKPLANE_1 | NVMe | {SETTING_E1, SETTING_E2, SETTING_E3 …} |
| CONFIG_F | CABLE_2 | BACKPLANE_2 | NVMe | {SETTING_F1, SETTING_F2, SETTING_F3 …} |
| CONFIG_G | CABLE_2 | BACKPLANE_2 | SATA | {SETTING_G1, SETTING_G2, …} |
| CONFIG_H | CABLE_2 | BACKPLANE_2 | SAS | {SETTING_H1, SETTING_H2, …} |

FIG. 2B

ADAPTABLE REDRIVER DESIGN ON DRIVE BACKPLANE WITH UNIVERSAL BACKPLANE MANAGEMENT CONTROLLER

BACKGROUND

Field

The increasing speed of Peripheral Component Interconnect Express and serial-attached small component serial interface buses may result in signal integrity issues in the design of storage servers. These signal integrity issues may be addressed by using redrivers and retimers. In one prior design, electronically erasable programmable read-only memory may be used to store static redriver settings, but this may require programming the redriver with different settings for different configurations of components in a storage server design. Furthermore, if the capability for redriver support is not reserved during the initial design of the system board, it may be necessary to redesign the system board if redriver support is subsequently desired, which redesign may require additional cost and time. In another prior design, a baseboard management controller may connect directly to the redriver, but such a configuration may be limited by space on the system board and may further require extra cable or longer tracing routes.

BRIEF DESCRIPTION OF THE FIGURES

FIG. 2A illustrates a data structure which stores combinations of configuration parameters and corresponding optimized redriver settings, in accordance with an aspect of the present application.

FIG. 2B illustrates a data structure which stores combinations of configuration parameters and corresponding optimized redriver settings, including one or more alternate optimized redriver settings, in accordance with an aspect of the present application.

In the figures, like reference numerals refer to the same figure elements.

DETAILED DESCRIPTION

Figure 1:
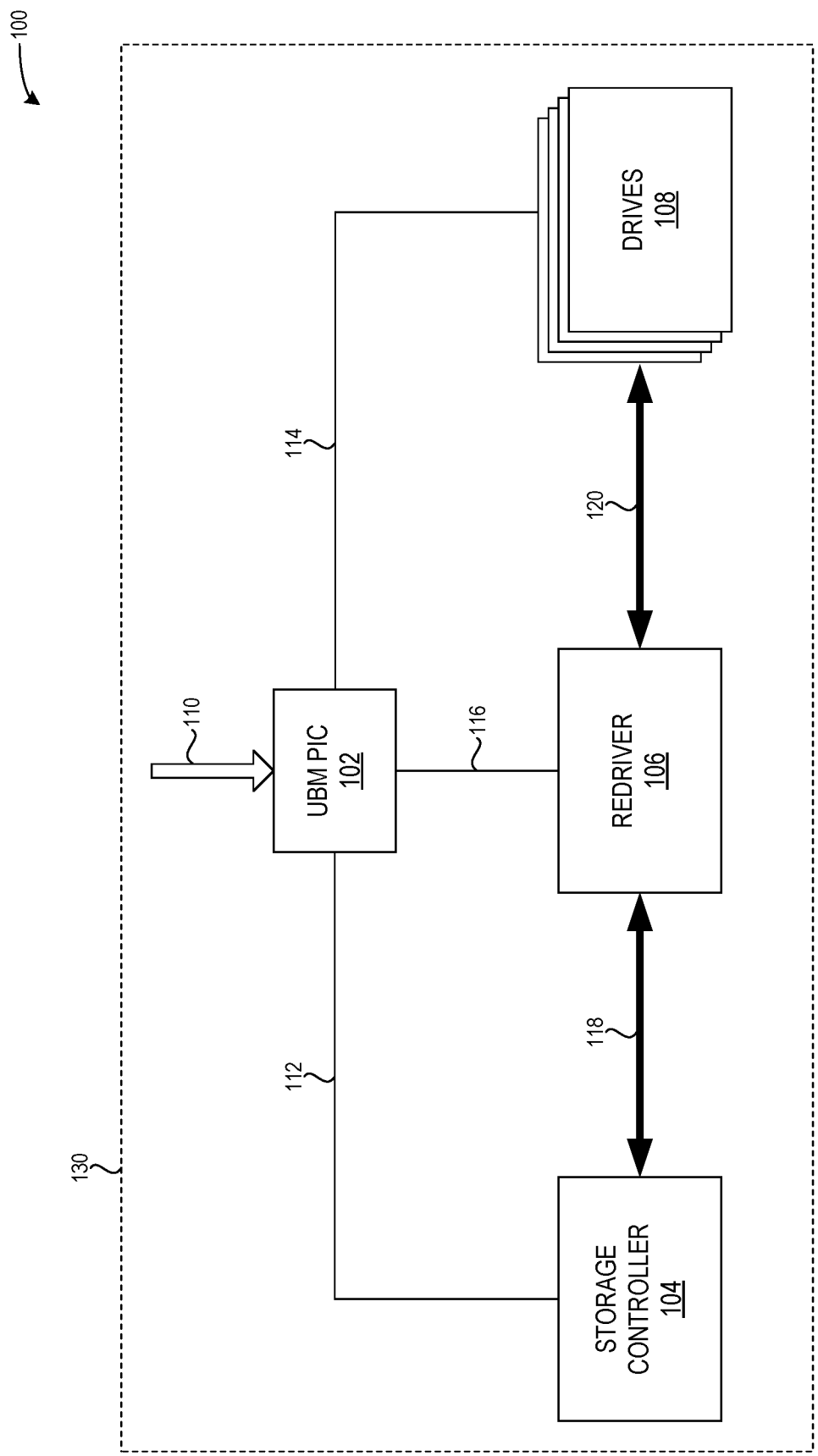
FIG. 1 illustrates an environment which facilitates enhancement of signal integrity between storage components in a backplane, in accordance with an aspect of the present application.

Aspects of the instant application can enhance signal integrity between storage components in a backplane over high speed buses by leveraging a universal backplane management (UBM) controller to manage optimized redriver settings based on various configurations and types of cables, backplanes, and storage devices or drives.

As described above, the increasing speed of certain high speed buses may result in signal integrity issues in the design of storage servers, which issues may be addressed by using redrivers and retimers. In general, a "redriver" refers to a component, unit, or entity which can amplify or enhance a signal, while a "retimer" refers to a component, unit, or entity which can retransmit a fresh copy of the signal. An example of a redriver is a "linear redriver," in which the amplitude of the output signal is a linear function or directly proportional to the amplitude of the input signal.

In one prior design, electronically erasable programmable read-only memory (EEPROMs) may be used to store static redriver settings, but this may require programming the redriver with different settings for different configurations of components in a storage server design. Furthermore, if the capability for redriver support is not reserved during the initial design of the system board, it may be necessary to redesign the system board if redriver support is subsequently desired, which redesign may require additional cost and time. In another prior design, a baseboard management controller (BMC) may connect directly to the redriver, but such a configuration may be limited by space on the system board and may further require extra cable or longer tracing routes.

The described aspects address the deficiencies of the prior designs by providing a system which determines optimized redriver settings for configurations of various physical topologies (e.g., based on cable type, backplane type, and drive type) and subsequently uses the determined optimized redriver settings when detecting a particular configuration associated with storage components in a backplane. The described aspects can thus provide an improved method, system, and apparatus for facilitating the enhancement of signal integrity between storage components in a backplane while avoiding the disadvantages of prior designs, including reprogramming, redesign, and requiring more physical space or components. An example environment is provided below in relation to FIG. 1, while data structures used to store the determined optimized redriver settings for various configurations are provided below in relation to FIGS. 2A and 2B.

The terms "storage device," "storage drive," and "drive" are used interchangeably in this disclosure and refer to any device, entity, module, or component that can store data and communicate with a storage controller.

The term "prior design" is used in this disclosure to refer to any approach, system, method, architecture, or design which currently exists and over which the described aspects provide an enhancement of signal integrity between components in a backplane.

The term "user" is used in this disclosure to refer to a design user, a design engineer, an engineer, or other design-related user who can perform the operations of the user described herein, e.g., performing experiments based on various configurations associated with storage components in a backplane to obtain optimized redriver settings for each configuration, as described below in relation to FIGS. 1 and 3.

The term "optimized redriver setting" is used in this disclosure to refer to one or more settings of a redriver which are determined based on testing configurations of various physical topologies of storage components in a backplane. Some of the physical topologies described herein can include cables, backplanes, and drives, while the configurations of such topologies may be based on cable type, backplane type, and drive type. Examples of redriver settings may include differential output voltage (VOD) settings, equalization settings, and direct current (DC) gain settings. As described below in relation to FIGS. 1, 2A, 2B, and 3, a user may determine optimized redriver settings for various configurations of storage components in a backplane by performing experiments. The user can determine an optimized redriver setting for a particular configuration and can further determine one or more "alternate optimized redriver settings" for the particular configuration. The alternate optimized redriver settings may be ordered based on a ranking or weight assigned by the user or the system. The alternate optimized redriver settings may also be ordered or prioritized based on applying a rule or policy configured by the user or the system, as described below in relation to FIG. 2B.

Environment Which Facilitates Enhancement of Signal Integrity Between Storage Components in a Backplane FIG. 1 illustrates an environment 100 which facilitates enhancement of signal integrity between storage components in a backplane, in accordance with an aspect of the present application. Environment 100 can depict a backplane 130 which includes: a universal backplane management (UBM) peripheral interface controller (PIC) 102; a storage controller 104; a redriver 106; and a plurality of storage devices or drives 108.

UBM PIC 102 can be a microcontroller which implements functionality and features associated with a specification which provides a common management framework for various storage devices, including but not limited to the Small Form Factor (SFF)-Technology Affiliate (TA)-1001 Universal Backplane Management Specification. UBM PIC 102 can receive configuration input (via a communication 110) which informs UBM PIC 102 about the physical topology of the backplane. The configuration input can include, e.g., cable information and a backplane identifier or type.

UBM PIC 102 can communicate with storage controller 104 via an inter-integrated circuit (I2C) bus 112. The UBM protocol would run on this I2C bus, which can be a UBM feature requirement. UBM PIC 102 can receive, from drives 108, sideband signals 114 which can include a group of low speed control signals, including the drive type, reset information, etc. UBM PIC 102 can communicate with redriver 106 via an I2C bus 116. The disclosed aspects can utilize bus 116 by sending the optimized redriver setting to activate the redriver based on a certain determined physical topology of the backplane (i.e., the configuration associated with the storage components in the backplane).

Storage controller 104 can be a controller card or a central processing unit (CPU)/platform controller hub (PCH) with an embedded storage controller. Drives 108 can be a storage device or a storage end device which stores data, e.g., a serial-attached small component serial interface (SAS) drive, a serial advanced technology attachment (SATA) drive, and a non-volatile memory express (NVMe) drive. Redriver 106 can be a linear redriver which enhances signal strength and provides an extension of a cable or routing length associated with a first bus 118 and a second bus 120.

Storage controller 104 and drives 108 can communicate with each other over two high speed buses via redriver 106. A redriver upstream high speed bus 118 ("first bus") can connect storage controller 104 with redriver 106, while a redriver downstream high speed bus 120 ("second bus") can connect redriver 106 with drives 108. Buses 118 and 120 can be a SAS, SATA, or Peripheral Component Interconnect Express bus, depending on the type of storage controller (104) which is supported/used as well as the types of drives (108) which are installed.

During design phase, a user can perform experiments based on configuration information associated with storage components in a backplane (e.g., the cable types associated with buses 118 and 120, the type of backplane 130, and the type of drives 108) to obtain optimized redriver settings for each configuration. UBM PIC 102 can store, in a data structure such as a table, the information for a respective configuration and a corresponding optimized redriver setting. The data structure can include a plurality of entries for the plurality of configurations, wherein a respective entry includes information for a respective configuration and a corresponding optimized redriver setting, as described below in relation to FIG. 2A.

If the system powers up or a storage device is inserted into backplane 130, UBM PIC 102 can detect the event and obtain configuration associated with a topology of backplane 130. This configuration information can include, e.g.: configuration input via communication 110, such as the cable type information associated with buses 118 and 120 as well as the type of backplane 130; and configuration information obtained via sideband signals 114, such as the type of drives 108. UBM PIC 102 can search, in the data structure based on the obtained configuration information, for a corresponding optimized setting for the redriver. UBM PIC 102 can then send a signal to redriver 106, via bus 116, to activate redriver 106 by enhancing signals received via the first bus 118 from storage controller 104 and sent via the second bus 120 to drive 108 and by enhancing signals received via the second bus 120 from drive 108 and sent via the first bus 118 to storage controller 104. After sending the activation signal to redriver 106 via bus 116, UBM PIC 102 can send a notification to storage controller 104 via bus 112, where the notification can indicate a detected event, such as a storage device being inserted into backplane 130. Storage controller 104 can receive the notification and begin high speed bus training, i.e., communication with drives 108 via buses 118 and 120.

The described aspects can use a pass/fail feedback loop or mechanism between storage controller 104, UBM PIC 102, and redriver 106. Storage controller 104 can monitor the enhanced signals transmitted from bus 118 over bus 120 and the enhanced signals transmitted from bus 120 over bus 118, e.g., by tracking the bit error count to determine issues associated with the transmitted signals. Storage controller 104 can compare the monitored signals to a predetermined threshold. If the comparison yields a result which indicates a success, storage controller 104 can send to UBM PIC 102, via bus 112, a message which indicates a success associated with the enhanced signals, which can indicate a successful performance of the activated optimized redriver setting. While UBM PIC 102 may not perform an action in response to receiving the success message, UMB PIC 102 may store the received result, e.g., associated with the corresponding entry for the configuration entry and the optimized setting in the data structure.

If the comparison yields a result which indicates a failure, storage controller 104 can send to UBM PIC 102, via bus 112, a message with indicates a failure associated with at least one of the enhanced signals. Upon receiving this failure message, UBM PIC 102 can search, in its data structure based on the configuration information (of the most recently determined configuration, e.g., of a most recent search), for an alternate optimized setting for the redriver. UBM PIC 102 can select this alternate optimized setting from an entry in the data structure for the given configuration information, where the entry can include (e.g., in a list) one or more alternate optimized settings for the redriver based on a ranking or weight for each alternate optimized setting, as described below in relation to FIG. 2B. The ranking or weight may be assigned by the user during creation of the data structure, and the ranking or weight may be indicated as an ordered list or by other means. UBM PIC 102 can subsequently reactivate redriver 106 by transmitting the selected alternate optimized setting to redriver 106 via bus 116.

Thus, the above-described operations of and communication between the storage components of backplane 130, including the described feedback loop, can facilitate the enhancement of signal integrity between storage controller 104 and drives 108 in backplane 130 by providing an optimized setting (i.e., "initially selected") for a given configuration and by further providing an alternate optimized setting for the given configuration in the event that the initially selected optimized setting does not function sufficiently well compared to a predetermined threshold.

The described aspects allow UBM PIC 102 to dynamically determine the optimized redriver setting to use based on detected configuration information associated with storage components of backplane 130, including the insertion, addition, removal, and swapping of drives 108 into backplane 130.

Data Structure Storing Combinations of Configuration Parameters and Optimized Redriver Settings FIG. 2A illustrates a data structure 200 which stores combinations of configuration parameters and corresponding optimized redriver settings, in accordance with an aspect of the present application. Data structure 200 can includes multiple entries 222 with fields which indicate, for a respective configuration: a configuration name or identifier 202; a type of cable 204; a type of backplane 206; a drive type 208; and a corresponding optimized redriver setting 210 for the respective configuration. As an example, an entry for a configuration name/ID of "CONFIG_C" can include: a cable type of "Cable_1"; a backplane type of "Backplane_1"; a drive type of "SATA"; and a corresponding optimized redriver setting of "Setting_C."

When the system detects a certain event (e.g., the system powering on, a storage device being inserted or detected in the backplane, etc.), the system can obtain the configuration information associated with a particular detected storage device and search the data structure for the optimized redriver setting for that obtained configuration. The system can subsequently activate the redriver based on the obtained setting, as described above in relation to FIG. 1 and below in relation to FIGS. 3 and 4.

FIG. 2B illustrates a data structure 240 which stores combinations of configuration parameters and corresponding optimized redriver settings, including one or more alternate optimized redriver settings, in accordance with an aspect of the present application. Data structure 240 can be similar to data structure 200 of FIG. 2A, but instead of a single optimized redriver setting 210, can include optimized redriver setting(s) 242, which can include a list of the optimized redriver settings based on a ranking or weight for each alternate optimized setting, where the ranking or weight can be assigned by the user or determined by the system. The list may be ordered based on the ranking or weight. In some aspects, the order of the list may be based on applying a rule or policy configured by the user or determined by the system. In table 240, optimized redriver setting(s) 242 may include a single redriver setting 242, e.g., an entry 258 can indicate a single redriver setting of "SETTING_D1." Optimized redriver setting(s) 242 may also include one or more alternate optimized redriver settings in an ordered, ranked list, where the first listed setting can be the initially used, first-ranked, or preferred setting. For example: entries 252, 254, 260 and 262 can each indicate a first-ranked optimized redriver setting and at least two alternate optimized redriver setting(s) 242, such as "SETTING_A1" followed by "SETTING_A2" and "SETTING_A3" in entry 252; and entries 256, 264, and 266 can each indicate a first-ranked optimized redriver setting and at least one alternate optimized redriver setting(s) 242, such as "SETTING_G1" followed by "SETTING_G2" in entry 264.

While optimized redriver setting(s) 242 in table 240 are depicted as an ordered list, other formats may be used, including a format which indicates, for each optimized redriver setting in the list, a specific weight or ranking for the respective redriver setting. Furthermore, optimized redriver setting(s) 242 may include only a single optimized redriver setting (similar to table 200 of FIG. 2A and as in entry 258) or a preferred optimized redriver setting along with one or more alternate optimized settings (as in entries 252, 254, 256, 260, 262, 264, and 266).

Furthermore, although tables 200 and 240 of, respectively, FIGS. 2A and 2B depict only three parameters for the configuration information (i.e., cable 204, backplane 206, and drive type 208), other parameters may be used in any combination with none, some, or all of the depicted configuration parameters.

Figure 3:
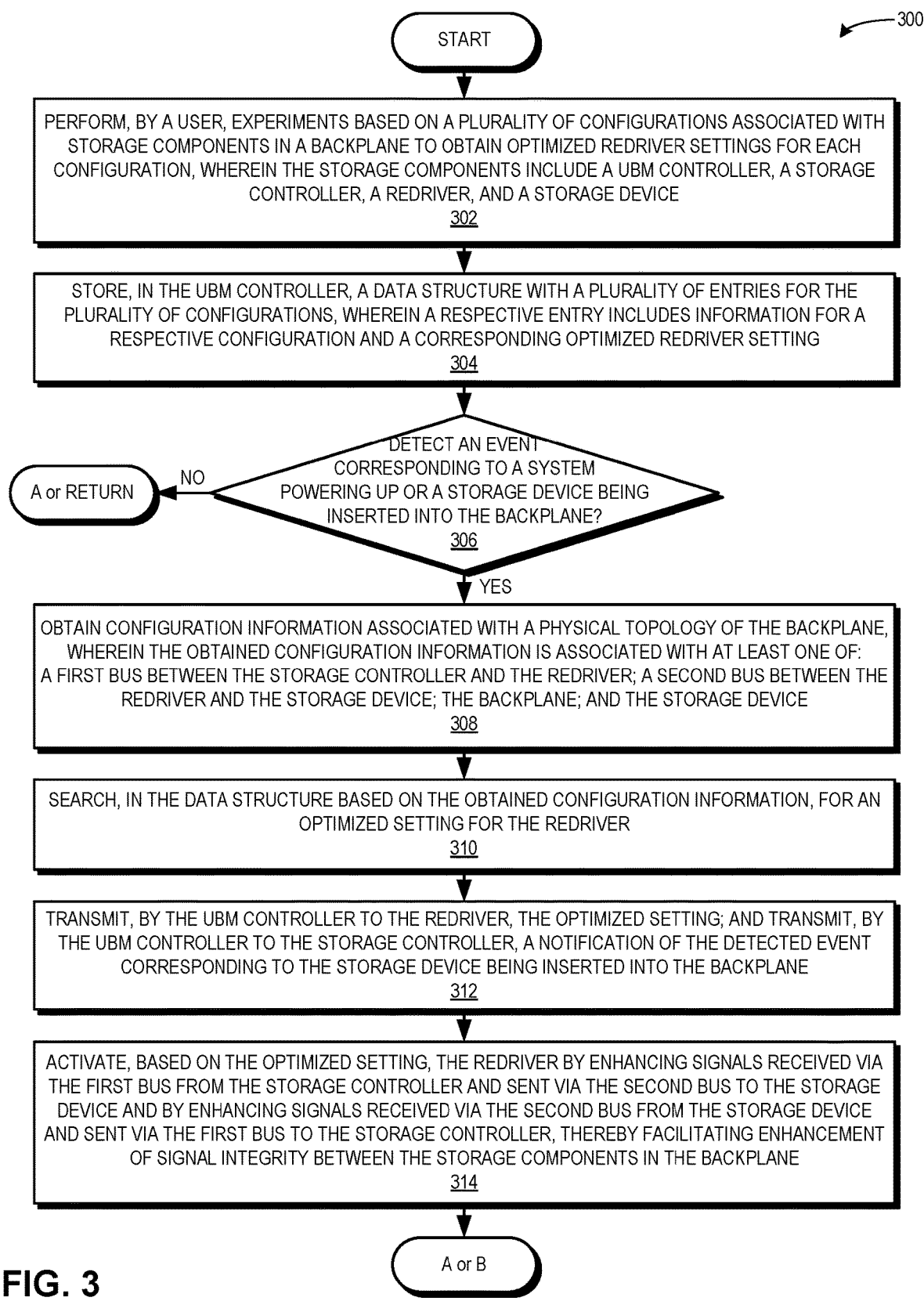
FIG. 3 presents a flowchart illustrating a method which facilitates enhancement of signal integrity between storage components in a backplane, in accordance with an aspect of the present application.

Method Which Facilitates Enhancement of Signal Integrity Between Storage Components in a Backplane FIG. 3 presents a flowchart 300 illustrating a method which facilitates enhancement of signal integrity between storage components in a backplane, in accordance with an aspect of the present application. During operation, the system performs, by a user, experiments based on a plurality of configurations associated with storage components in a backplane to obtain optimized redriver settings for each configuration, wherein the storage components include a UBM controller, a storage controller, a redriver, and a storage device (operation 302). The system stores, in the UBM controller, a data structure with a plurality of entries for the plurality of configurations, wherein a respective entry includes information for a respective configuration and a corresponding optimized redriver setting (operation 304).

If the system does not detect an event corresponding to a system powering up or a storage device being inserted into the backplane (decision 306), the operation continues at Label A or returns. If the system detects an event corresponding to a system powering up or a storage device being inserted into the backplane (decision 306), the system obtains configuration information associated with a physical topology of the backplane, wherein the configuration information is associated with at least one of: a first bus between the storage controller and the redriver; a second bus between the redriver and the storage device; the backplane; and the storage device (operation 308). The system searches, in the data structure based on the configuration information, for an optimized setting for the redriver (operation 310). The system transmits, by the UBM controller, the optimized setting to the redriver, and the system transmits, by the UBM controller to the storage controller, a notification of the detected event corresponding to the storage device being inserted into (or detected as inserted into) the backplane (operation 312), which can cause the storage controller to begin communication with the storage device via the first bus and the second bus. Transmitting the notification of the detected event to the storage controller may occur subsequent to transmitting the optimized setting to the redriver.

Based on the transmitted optimized setting, the system activates, based on the optimized setting, the redriver by enhancing signals received via the first bus from the storage controller and sent via the second bus to the storage device and by enhancing signals received via the second bus from the storage device and sent via the first bus to the storage controller, thereby facilitating enhancement of signal integrity between the storage components in the backplane (operation 314). The operation continues at Label A of FIG. 4 or Label B of FIG. 5.

Figure 4:
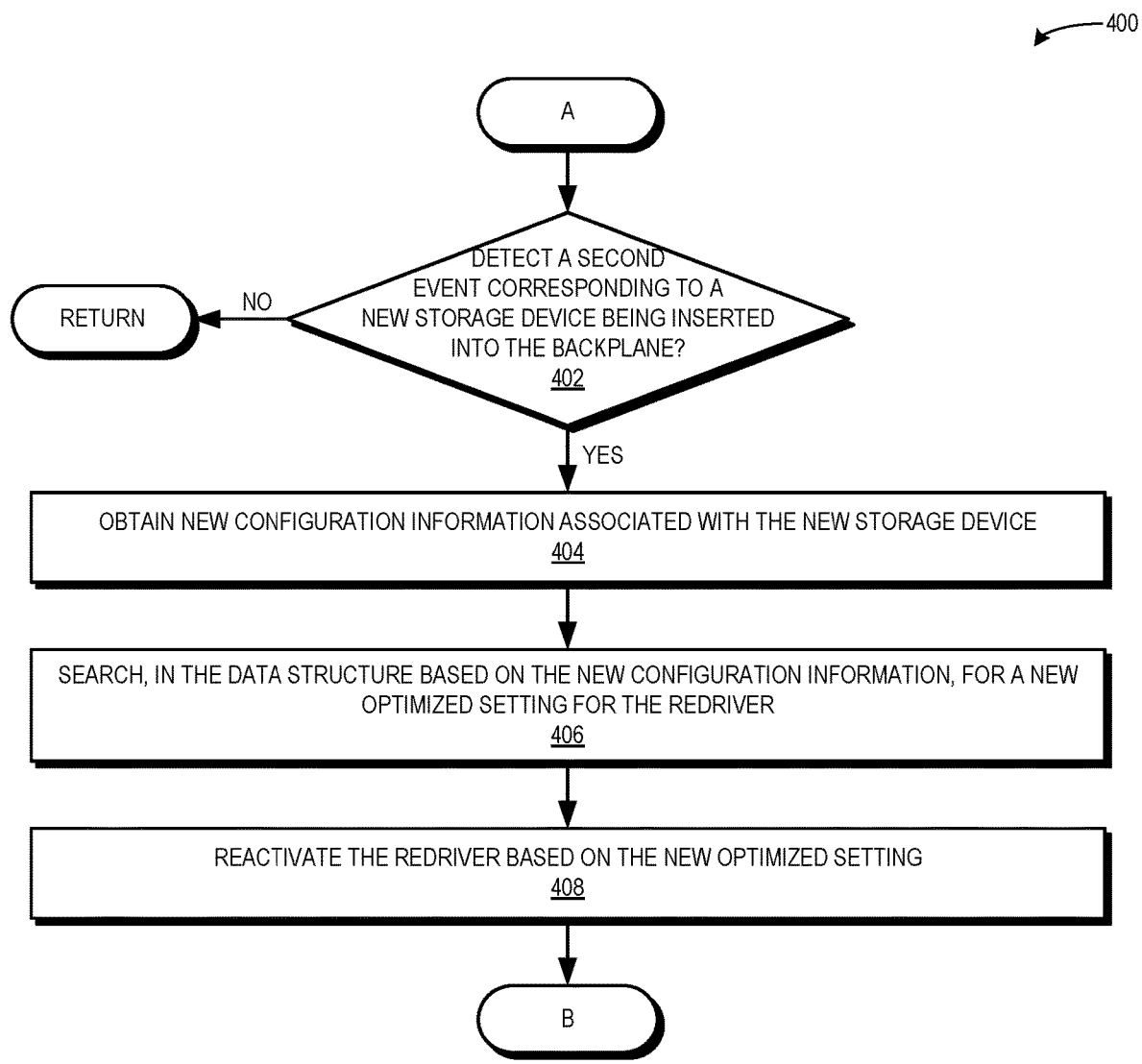
FIG. 4 presents a flowchart illustrating a method which facilitates enhancement of signal integrity between storage components in a backplane, including searching for a new optimized redriver setting, in accordance with an aspect of the present application.

FIG. 4 presents a flowchart 400 illustrating a method which facilitates enhancement of signal integrity between storage components in a backplane, including searching for a new optimized redriver setting, in accordance with an aspect of the present application. If the system does not detect a second event corresponding to a new storage device being inserted into the backplane (decision 402), the operation returns. If the system detects a second event corresponding to a new storage device being inserted into the backplane (decision 402), the system obtains new configuration information associated with the new storage device (operation 404). The system searches, in the data structure based on the new configuration information, for a new optimized setting for the redriver (operation 406). The new optimized setting may be selected from an ordered list of alternate optimized settings for the new configuration information, or the new optimized setting may be selected from one or more alternate optimized settings based on a previously configured rule or policy, as described above in relation to FIG. 2B. The system reactivates the redriver based on the new optimized setting (operation 408). The reactivation may occur based on a design of the redriver's integrated circuit (IC), e.g., by resetting the redriver and loading the new optimized setting, or by disabling the redriver, loading the new optimized setting, and enabling the redriver. The operation continues at Label B of FIG. 5.

Figure 5:
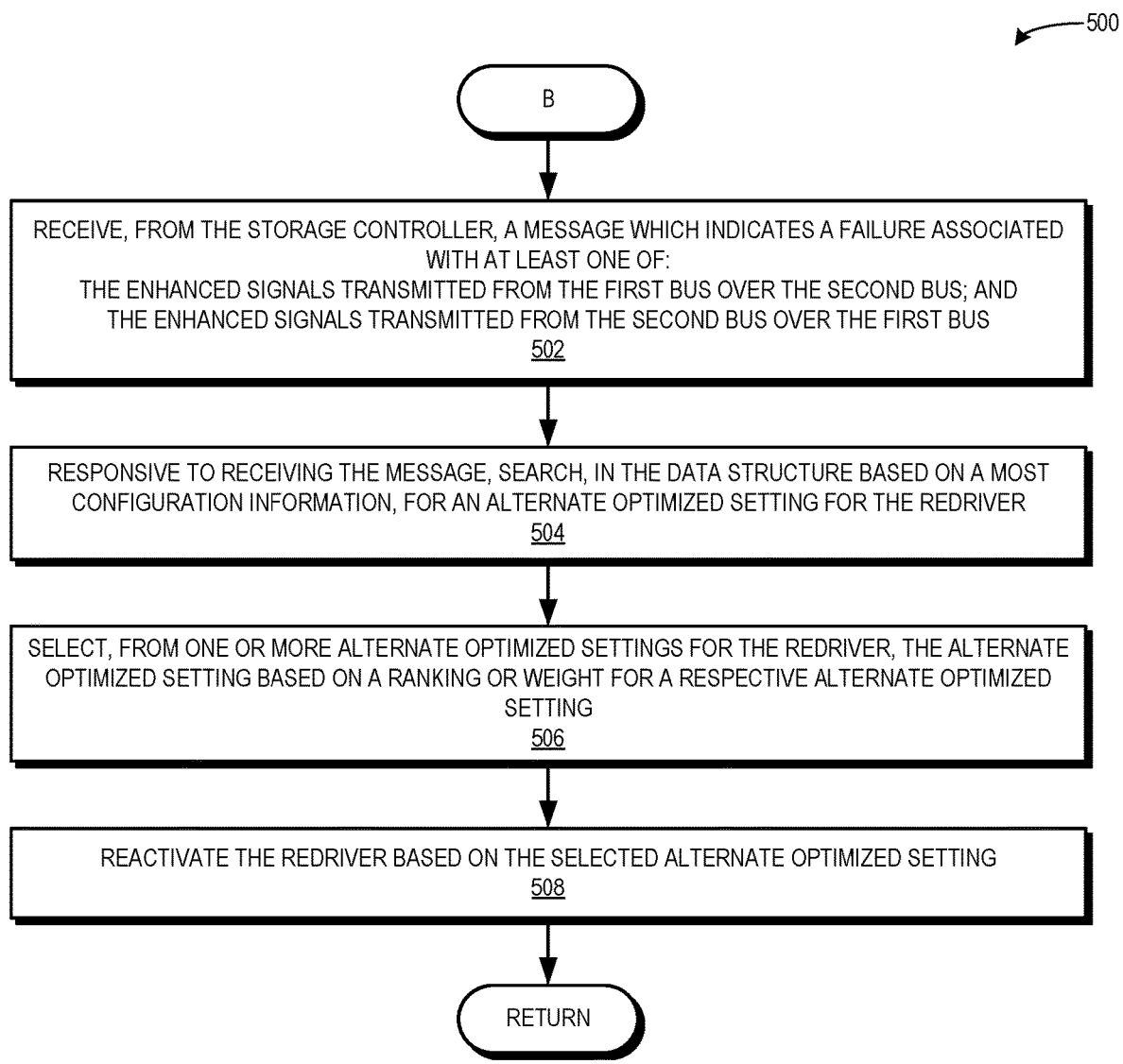
FIG. 5 presents a flowchart illustrating a method which facilitates enhancement of signal integrity between storage components in a backplane, including a feedback loop between a storage controller and a universal backplane management controller, in accordance with an aspect of the present application.

FIG. 5 presents a flowchart 500 illustrating a method which facilitates enhancement of signal integrity between storage components in a backplane, including a feedback loop between the storage controller and the UBM controller, in accordance with an aspect of the present application. The system receives, from the storage controller, a message which indicates a failure associated with at least one of: the enhanced signals transmitted from the first bus over the second bus; and the enhanced signals transmitted from the second bus over the first bus (operation 502). As described above in relation to FIG. 1, the indicated failure may be based on comparing monitored signals to a predetermined threshold. Responsive to receiving the message, the system searches, in the data structure based on the configuration information, for an alternate optimized setting for the redriver (operation 504). The system selects, from one or more alternate optimized settings for the redriver, the alternate optimized setting based on a ranking or weight for a respective alternate optimized setting (operation 506). The system reactivates the redriver based on the selected alternate optimized setting (operation 508). The operation returns. Although not depicted in FIG. 5, the system can also receive a message which indicates a success associated with the enhanced signals, as described above in relation to UBM PIC 102 and bus 112 of FIG. 1.

Figure 6:
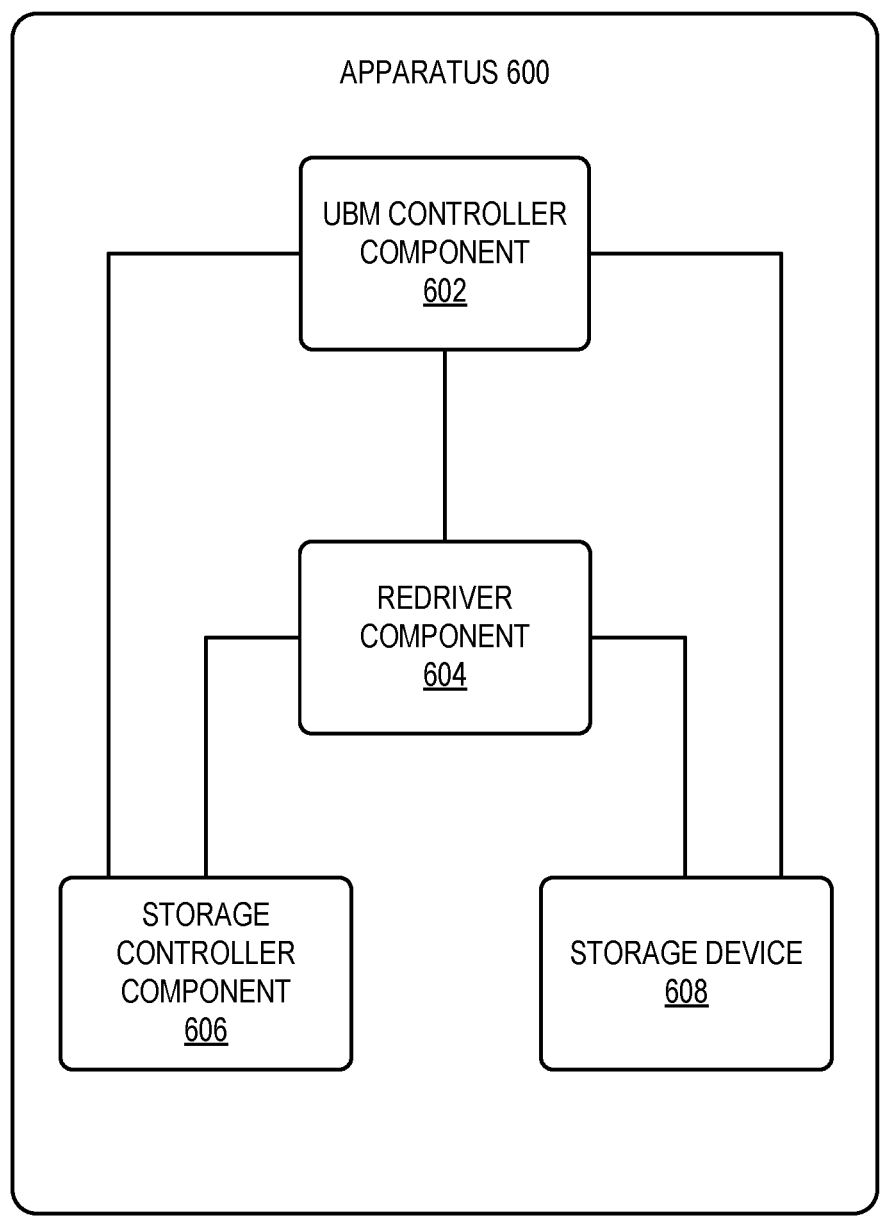
FIG. 6 illustrates an apparatus which facilitates enhancement of signal integrity between storage components in a backplane, in accordance with an aspect of the present application.

Apparatus Which Facilitates Enhancement of Signal Integrity Between Storage Components in a Backplane FIG. 6 illustrates an apparatus 600 which facilitates enhancement of signal integrity between storage components in a backplane, in accordance with an aspect of the present application. Apparatus 600 can include: a UBM controller component 602 to perform similar operations as UBM PIC 102; a redriver component 604 to perform similar operations as redriver 106; a storage controller component 606 to perform similar operations as storage controller 104; and a storage device 608 to perform similar operations as drives 108.

In general, the disclosed aspects provide a method, storage medium, and an apparatus for enhancing signal integrity between storage components in a backplane. The system detects an event corresponding to a system powering up or a storage device being inserted into the backplane. In response to detecting the event, the system obtains configuration information associated with a physical topology of the backplane. The configuration information is associated with at least one of: a first bus between a storage controller and a redriver; a second bus between the redriver and the storage device; the backplane; and the storage device. The system searches, in a data structure based on the configuration information, for an optimized setting for the redriver. The system activates, based on the optimized setting, the redriver by enhancing signals received via the first bus from the storage controller and sent via the second bus to the storage device and by enhancing signals received via the second bus from the storage device and sent via the first bus to the storage controller, thereby facilitating enhancement of signal integrity between the storage components in the backplane.

In a variation on this aspect, the system detects a second event corresponding to a new storage device being inserted into the backplane. In response to detecting the second event, the system obtains new configuration information associated with the new storage device. The system searches, in the data structure based on the new configuration information, for a new optimized setting for the redriver. The system reactivates the redriver based on the new optimized setting.

In a further variation on this aspect, the system receives, from the storage controller, a message which indicates a failure associated with at least one of: the enhanced signals transmitted from the first bus over the second bus; and the enhanced signals transmitted from the second bus over the first bus. Responsive to receiving the message, the system searches, in the data structure based on the configuration information, for an alternate optimized setting for the redriver. The system reactivates the redriver based on the alternate optimized setting.

In a further variation, the alternate optimized setting is selected from one or more alternate optimized settings for the redriver based on a ranking or weight for a respective alternate optimized setting.

In a further variation, a respective entry in the data structure comprises: the configuration information associated with at least one of the first bus, the second bus, the backplane, and the storage device; an optimized setting for the redriver; and one or more associated alternate optimized settings for the redriver.

In a further variation, the backplane comprises a universal backplane management (UBM) controller, the storage controller, the redriver, and the storage device.

In a further variation, the system transmits, by the UBM controller, the optimized setting to the redriver. The system transmits, by the UBM controller to the storage controller, a notification of the detected event corresponding to the storage device being inserted into the backplane, which causes the storage controller to begin communication with the storage device via the first bus and the second bus. Transmitting the notification of the detected event to the storage controller may occur subsequent to transmitting the optimized setting to the redriver.

In a further variation, the UBM controller comprises a microcontroller which implements features associated with universal backplane management, and the UBM controller communicates with the storage controller and the redriver over an inter-integrated circuit (I2C) bus.

In a further variation, the storage controller comprises one of: a controller card; a central processing unit (CPU) with an embedded storage controller; and a platform controller hub (PCH) with an embedded storage controller.

In a further variation, the redriver comprises a linear redriver which enhances signal strength and provides an extension of a cable or routing length associated with the first bus and the second bus.

In a further variation, the storage device comprises one of: a serial-attached small component serial interface (SAS) drive; a serial advanced technology attachment (SATA) drive; and a non-volatile memory express (NVMe) drive.

In a further variation, the first bus and the second bus comprise one of: a high speed bus; a SAS bus; a SATA bus; and an NVMe bus.

In another aspect, a non-transitory computer-readable storage medium stores instructions that when executed by a computer cause the computer to perform the method described above, including in relation to FIGS. 1, 3, 4, and 5.

In yet another aspect, a backplane apparatus can comprise: a universal backplane management (UBM) controller component; a storage controller component; a redriver component; and a storage device. The UBM controller component can: detect an event corresponding to a system powering up or a storage device being inserted into the backplane; in response to detecting the event, obtain configuration information associated with a physical topology of the backplane, wherein the configuration information is associated with at least one of a first bus between the storage controller component and the redriver, a second bus between the redriver component and the storage device, the backplane, and the storage device; search, in a data structure based on the configuration information, for an optimized setting for the redriver component; and activate, based on the optimized setting, the redriver component by enhancing signals received via the first bus from the storage controller component and sent via the second bus to the storage device and by enhancing signals received via the second bus from the storage device and sent via the first bus to the storage controller component, thereby facilitating enhancement of signal integrity between the storage components in the backplane. The components of the backplane apparatus can perform the methods described above, including in relation to FIGS. 1, 3, 4, and 5.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method for enhancing signal integrity between storage components in a backplane, the method comprising:
   storing, by a microcontroller associated with the backplane, a data structure with a plurality of entries for a plurality of configurations associated with storage components in the backplane, wherein a respective entry includes information for a respective configuration and at least one corresponding optimized redriver setting;
   detecting, by the microcontroller, an event corresponding to a system powering up or a storage device being inserted into the backplane;
   in response to detecting the event, obtaining configuration information associated with a physical topology of the backplane, wherein the configuration information is associated with at least one of:
      a first bus between a storage controller and a redriver;
      a second bus between the redriver and the storage device;
      the backplane; and
      the storage device;
   searching, in the data structure based on the obtained configuration information, for an optimized setting for the redriver;
   activating, based on the optimized setting, the redriver by enhancing signals received via the first bus from the storage controller and sent via the second bus to the storage device and by enhancing signals received via the second bus from the storage device and sent via the first bus to the storage controller, thereby facilitating enhancement of signal integrity between the storage components in the backplane;
   responsive to receiving a failure message, searching, by the microcontroller, in the data structure based on the configuration information, for an alternate optimized setting for the redriver;
   selecting, from one or more alternate optimized settings for the redriver in the data structure, the alternate optimizing setting for the redriver based on a ranking or weight for a respective alternate optimized setting; and
   reactivating the redriver based on the alternate optimized setting.

2. The method of claim 1, further comprising:
   detecting a second event corresponding to a new storage device being inserted into the backplane;

in response to detecting the second event, obtaining new configuration information associated with the new storage device;

searching, in the data structure based on the new configuration information, for a new optimized setting for the redriver; and reactivating the redriver based on the new optimized setting.

3. The method of claim 1,
wherein the failure message indicates a failure associated with at least one of:
the enhanced signals transmitted from the first bus over the second bus; and
the enhanced signals transmitted from the second bus over the first bus.

4. The method of claim 1, further comprising:
selecting the alternate optimized setting from one or more alternate optimized settings for the redriver based on a rule or policy.

5. The method of claim 1, wherein a respective entry in the data structure comprises:
the configuration information associated with at least one of the first bus, the second bus, the backplane, and the storage device;
an optimized setting for the redriver; and
one or more associated alternate optimized settings for the redriver.

6. The method of claim 1, further comprising:
wherein the backplane comprises a universal backplane management (UBM) controller, the storage controller, the redriver, and the storage device.

7. The method of claim 6, further comprising:
transmitting, by the UBM controller, the optimized setting to the redriver; and
transmitting, by the UBM controller to the storage controller, a notification of the detected event corresponding to the storage device being inserted into the backplane, which causes the storage controller to begin communication with the storage device via the first bus and the second bus.

8. The method of claim 6,
wherein the UBM controller comprises a microcontroller which implements features associated with universal backplane management, and
wherein the UBM controller communicates with the storage controller and the redriver over an inter-integrated circuit (I2C) bus.

9. The method of claim 1, wherein the storage controller comprises one of:
a controller card;
a central processing unit (CPU) with an embedded storage controller; and
a platform controller hub (PCH) with an embedded storage controller.

10. The method of claim 1,
wherein the redriver comprises a linear redriver which enhances signal strength and provides an extension of a cable or routing length associated with the first bus and the second bus.

11. The method of claim 1, wherein the storage device comprises one of:
a serial-attached small component serial interface (SAS) drive;
a serial advanced technology attachment (SATA) drive; and
a non-volatile memory express (NVMe) drive.

12. The method of claim 1, wherein the first bus and the second bus comprise one of:
a high speed bus;
a SAS bus;
a SATA bus; and
an NVMe bus.

13. A non-transitory computer-readable storage medium storing instructions that when executed by a computer cause the computer to perform a method, the method comprising:
storing, by a microcontroller associated with the backplane, a data structure with a plurality of entries for a plurality of configurations associated with storage components in the backplane, wherein a respective entry includes information for a respective configuration and at least one corresponding optimized redriver setting;
detecting, by the microcontroller, an event corresponding to a system powering up or a storage device being inserted into the backplane;
in response to detecting the event, obtaining configuration information associated with a physical topology of the backplane, wherein the configuration information is associated with at least one of:
a first bus between a storage controller and a redriver;
a second bus between the redriver and the storage device;
the backplane; and
the storage device;
searching, in the data structure based on the obtained configuration information, for an optimized setting for the redriver;
activating, based on the optimized setting, the redriver by enhancing signals received via the first bus from the storage controller and sent via the second bus to the storage device and by enhancing signals received via the second bus from the storage device and sent via the first bus to the storage controller, thereby facilitating enhancement of signal integrity between the storage components in the backplane;
responsive to receiving a failure message, searching, by the microcontroller, in the data structure based on the configuration information, for an alternate optimized setting for the redriver;
selecting, from one or more alternate optimized settings for the redriver in the data structure, the alternate optimizing setting for the redriver based on a ranking or weight for a respective alternate optimized setting; and
reactivating the redriver based on the alternate optimized setting.

14. The non-transitory computer-readable storage medium of claim 13, wherein the method further comprises:
detecting a second event corresponding to a new storage device being inserted into the backplane;
in response to detecting the second event, obtaining new configuration information associated with the new storage device;
searching, in the data structure based on the new configuration information, for a new optimized setting for the redriver; and
reactivating the redriver based on the new optimized setting.

15. The non-transitory computer-readable storage medium of claim 13,
wherein the failure message indicates a failure associated with at least one of:
the enhanced signals transmitted from the first bus over the second bus; and the enhanced signals transmitted from the second bus over the first bus.

16. The non-transitory computer-readable storage medium of claim 13, wherein a respective entry in the data structure comprises:
 the configuration information associated with at least one of the first bus, the second bus, the backplane, and the storage device;
 an optimized setting for the redriver; and
 one or more associated alternate optimized settings for the redriver.

17. The non-transitory computer-readable storage medium of claim 13,
 wherein the backplane comprises a universal backplane management (UBM) controller, the storage controller, the redriver, and the storage device, and
 wherein the method further comprises:
  transmitting, by the UBM controller, the optimized setting to the redriver; and
  subsequent to transmitting the optimized setting to the redriver, transmitting, by the UBM controller to the storage controller, a notification of the detected event corresponding to the storage device being inserted into the backplane.

18. The non-transitory computer-readable storage medium of claim 17,
 wherein the UBM controller comprises a microcontroller which implements features associated with universal backplane management,
 wherein the UBM controller communicates with the storage controller and the redriver over an inter-integrated circuit (I2C) bus,
 wherein the storage controller comprises one of: a controller card; a central processing unit (CPU) with an embedded storage controller; and a platform controller hub (PCH) with an embedded storage controller,
 wherein the redriver comprises a linear redriver which enhances signal strength and provides an extension of a cable or routing length associated with the first bus and the second bus,
 wherein the storage device comprises one of: a serial-attached small component serial interface (SAS) drive; a serial advanced technology attachment (SATA) drive; and a non-volatile memory express (NVMe) drive, and
 wherein the first bus and the second bus comprise one of: a high speed bus; a SAS bus; a SATA bus; and an NVMe bus.

19. A backplane apparatus, comprising:
 a universal backplane management (UBM) controller component;
 a storage controller component;
 a redriver component; and
 a storage device,
 the UBM controller component to:
  store a data structure with a plurality of entries for a plurality of configurations associated with storage components in the backplane, wherein a respective entry includes information for a respective configuration and at least one corresponding optimized redriver setting;
  detect an event corresponding to a system powering up or a storage device being inserted into the backplane;
  in response to detecting the event, obtain configuration information associated with a physical topology of the backplane, wherein the configuration information is associated with at least one of:
   a first bus between the storage controller component and the redriver component;
   a second bus between the redriver component and the storage device;
   the backplane; and
   the storage device;
  search, in the data structure based on the obtained configuration information, for an optimized setting for the redriver component;
  activate, based on the optimized setting, the redriver component by enhancing signals received via the first bus from the storage controller component and sent via the second bus to the storage device and by enhancing signals received via the second bus from the storage device and sent via the first bus to the storage controller component, thereby facilitating enhancement of signal integrity between the storage components in the backplane;
  responsive to receiving a failure message, search, by the microcontroller, in the data structure based on the configuration information, for an alternate optimized setting for the redriver;
  select, from one or more alternate optimized settings for the redriver in the data structure, the alternate optimizing setting for the redriver based on a ranking or weight for a respective alternate optimized setting; and
  reactivate the redriver based on the alternate optimized setting.

20. The backplane apparatus of claim 19,
 the storage controller component to monitor the enhanced signals transmitted from the first bus over the second bus and the enhanced signals transmitted from the second bus over the first bus; and
 the UBM controller component further to:
  receive, from the storage controller component, the failure message associated with at least one of:
   the enhanced signals transmitted from the first bus over the second bus; and
   the enhanced signals transmitted from the second bus over the first bus.

* * * * *